United States Patent [19]

Irving

[11] 4,001,804
[45] Jan. 4, 1977

[54] GROUND FAULT PROTECTION FOR ELECTRICAL POWER DISTRIBUTION SYSTEMS

[75] Inventor: Fred W. Irving, New Minas, Canada

[73] Assignee: I-T Safety Enterprises Limited, Berwick, Canada

[22] Filed: Nov. 25, 1974

[21] Appl. No.: 526,858

[52] U.S. Cl. ............................ 340/255; 317/18 A; 317/18 B

[51] Int. Cl.² ........................................ G08B 21/00

[58] Field of Search ....... 340/255; 317/18 D, 18 R, 317/18 A, 18 B, 18 C; 200/153 V, 162

[56] References Cited

UNITED STATES PATENTS

| | | | |
|---|---|---|---|
| 2,342,800 | 2/1944 | Griscom | 317/18 R |
| 3,072,827 | 1/1963 | Benish | 340/255 UX |
| 3,315,129 | 4/1967 | Fisher | 317/18 R |
| 3,609,732 | 9/1971 | Kasahara et al. | 340/237 R |

Primary Examiner—John W. Caldwell
Assistant Examiner—Daniel Myer

[57] ABSTRACT

Ground fault protection for an electrical installation is provided by isolating from neutral the service entry box and the raceways and conduits forming a ground return system connected to the box, and connecting a device between the box and neutral which responds to current leakage into the ground return system above a predetermined level by opening a switch in the entry box to interrupt the supply to the system.

15 Claims, 5 Drawing Figures

GROUND FAULT PROTECTION FOR ELECTRICAL POWER DISTRIBUTION SYSTEMS

BACKGROUND OF THE INVENTION

This invention relates to ground fault protection arrangements for electrical distribution systems, and is more particularly though not exclusively concerned with electrical service entrance boxes for domestic and industrial electrical installations of the kind including a means to interrupt the electrical supply in the event of fault conditions arising in the installation.

In the conventional service entrance box, protection against ground faults and circuit overloads is by way of fuses or alternative circuit breaking devices which respond to the passage of excessive current through main or branch circuits connected to the line conductors of the supply.

The disadvantage of this conventional arrangement is that only ground faults which allow a current in excess of the maximum permissible load in the main or branch circuit concerned will result in operation of the circuit breaking device. However, ground faults can easily occur which are of sufficiently high resistance to fail to overload the circuit concerned, although passing sufficient current to cause intense local heat generation. Such faults are a major cause of serious fires. Even if the ground fault itself involves a short circuit, the ground return system in the electrical installation, represented by a system of raceways, conduits and/or ground return wires, may include poor connections or other zones of high resistance which themselves can limit the current flowing as a result of a ground fault to a level insufficient to operate the circuit breaker device, whilst a fire hazard still exists due to excessive generation of heat at points within the ground return system. Unfortunately, defectively installed ground return systems which only provide a relatively high resistance return path are all too common.

A number of attempts have been made to overcome this problem. The most frequent approach has been to detect any imbalance between the current flowing in the line conductor and the neutral conductor in a circuit since if these currents are not equal, it follows that an alternative current path, normally through the ground return system, must exist. In one commonly used form, such a device consists of a differential transformer having primary windings in series with the line and neutral conductors, and a secondary winding controlling a circuit breaker. Such systems are relatively sophisticated, and cannot easily be incorporated in existing installations.

A further problem with both the above systems is that they are incapable of detecting faults occurring on the supply side of a service entry box, for example by reason of a short circuit or leakage between a line conductor and an entry conduit.

It would be desirable if an effective and simple system could be provided, which could be incorporated into existing installations, and which would reliably protect the entire installation against the existence of ground faults which, whilst insufficient to operate conventional circuit breaking arrangements protecting individual branch circuits, nevertheless are of sufficient magnitude to present a fire hazard.

SUMMARY OF THE INVENTION

In one of its aspects the present invention relates to an electrical installation having a supply main comprising a neutral conductor and at least one line conductor, a plurality of branch circuits, a service entry box establishing connection between the supply main conductors and the branch circuits and including switch means to interrupt the at least one line conductor, and a ground return system establishing a ground return path to the entry box in parallel with each of the branch circuits. In accordance with the invention the ground return system and the service entry box are isolated from all neutral conductors in the installation, and the service entry box includes means electrically connected between the box and ground and responsive to the passage of a predetermined current to open the switch means in the box.

In accordance with another aspect of the invention, a service entry box comprises a conductive casing, means to connect the line and neutral conductors of a supply cable to line and neutral bus bars mounted within and electrically isolated from the casing. Means are provided to establish a ground connection to the neutral bus bar, and switch means mounted within the box are latchable in a closed condition to establish electrical connection between at least one line conductor of the supply cable and a corresponding line bus bar. Electrically operated unlatching means are connected between the casing and the neutral bus bar.

With these arrangements, the isolation of the ground return system, and the entry box to which it is connected, means that any ground fault giving rise to leakage to the ground return system must result in the leakage current passing through the means provided to open the switch in the box controlling the supply. These means may readily be arranged so as to operate at any desired current level, which may be selected so as to be low enough to avoid any possibility of fire risk due to ground faults. Moreover, if an entry conduit through which the supply cable reaches the entry box is electrically bonded to the latter, as is normally required, ground faults occurring in the entry conduit will also be detected.

A further valuable feature of the invention is that an audible or visible alarm device may also be connected between the entry box casing and ground so as to provide an indication of the existence of a ground fault of lesser magnitude than is required to trip the unlatching means opening the switch controlling the supply to the system.

SHORT DESCRIPTION OF THE DRAWINGS

For a better understanding of the invention, reference may be had to a preferred embodiment of the invention described with reference to the accompanying drawings, in which.

DETAILED DESCRIPTION OF THE DRAWINGS

Figure 1:
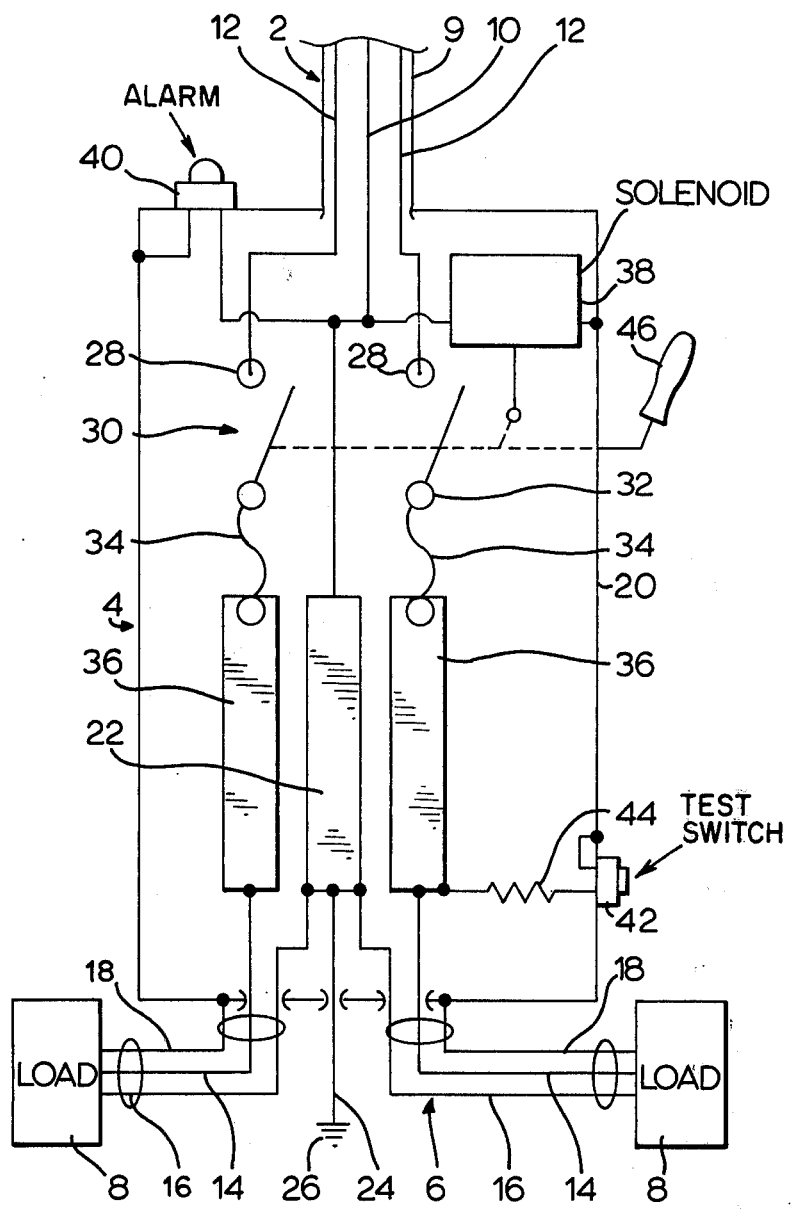
FIG. 1 is a schematic diagram illustrating a service entry box incorporated in an electrical installation.

Reference will first be had to FIG. 1 of the drawings. This figure shows in very diagrammatic and much simplified form an electrical installation incorporating the principles of the invention. The system basically comprises a supply cable 2, a service entry box 4, and branch circuits 6 connecting the entry box to loads 8. The supply cable 2 is shown as having a neutral conductor 10 and two line conductors 12 at opposite phases, so that the line conductors are of equal and opposite potentials relative to the neutral conductor. The cable enters the entry box through a metal entry conduit 9 connected to a metal outer casing 20 of the box 4. The branch circuits are each shown as comprising neutral and line conductors enclosed in an electrically continuous conduit or raceway which forms a ground return path 18 electrically connected to the casing 20. The ground return paths 18 may or may not be connected to the structure of an appliance forming a load, according to the nature of the appliance. Although the branch circuits have been described as having line and neutral conductors 14 and 16, it will be understood that the conductors could include two line conductors of opposite phases.

Referring now also to the remaining Figures, the cable 2 enters the box 4, and the neutral conductor is connected to a neutral bus bar 22, a further connection 24 being made from the bus bar 22 to a ground point 26. However, contrary to usual practice, the bus bar 22 is isolated from the casing 20 of the box 4. The significance of this is discussed more fully below. The line conductors 12 of the supply cable 2 are connected to terminals 28 of a double pole switch 30 mounted within the box 4, the remaining terminals 32 of the switch being connected via fuses 34 to line bus bars 36. The neutral and line conductors of the branch circuits are connected to the neutral and line bus bars respectively. In practice, the connections to the branch circuits would be made through fuses or contact breakers which for the sake of simplicity are not shown in the drawings.

Connected between the neutral conductor 10 or the bus bar 22 and the casing 20 is the winding of a solenoid 38, which solenoid on energization causes the switch 30, if closed to move to a open condition.

Should a ground fault develop in one of the branch circuits or in the entry conduit resulting in a total or partial short circuit between a line conductor or some part connected to it and the ground return system, the only path for the resultant leakage current back to the neutral conductor is through the winding of the solenoid 38. This not only limits the leakage current to a safe level, but if the leakage current is sufficient, the solenoid will be actuated and will open the switch 30, thus interrupting the supply to the installation. Thus any ground leakage current sufficient to operate the solenoid will result in disconnection of the supply from the installation; it is clear that only a relatively small current is required to operate the solenoid, and thus disconnection will take place without current leakage rising to a level which presents a fire risk.

Apart from the provision of the solenoid 38, the primary difference between the service entrance box of the invention and of those previously known is that the bus bar 22 is isolated from the box, and the box itself and the entry conduit and ground return paths connected to it are all isolated from ground except for the connection made through the solenoid 38. This connection through the solenoid 38 may be supplemented by a further connection in parallel (as shown) or series with that to the solenoid through an audible and/or visible alarm device 40, shown in FIG. 2 as a combined lamp and buzzer. As is shown in FIG. 1, provision may be made to test the response of the system to ground faults, by connecting a push button switch 42 and a resistance 44 in series between the casing 20 and one of the line bus bars 36. The value of the resistance 44 is calculated so that it will pass an amount of current simulating the smallest magnitude ground leakage current intended to operate the solenoid 38. When the push button switch 42 is depressed, it completes a circuit through the resistance 44 and the winding of solenoid 38, which will result in the switch 30 being opened if the apparatus is working properly. The switch 42 also serves to test whether any connection exists between a neutral conductor in the system and any part of the ground return system connected to the entry box; the presence of such a connection would provide an alternative path to the solenoid for leakage currents. If such a connection exists, operation of the switch 42 will not cause the switch 30 to open, thus indicating a fault in the system.

In order to enable the switch 30 to be re-set to its closed condition, or to be operated manually, an electrically insulated or non-conductive operating handle 46 is provided.

Further details of the mechanical construction of the service entry box are shown in FIGS. 2 to 5. As already described, the box comprises a metal casing 20 to which the various internal components of the box are mounted. The box is normally closed by a lid 48, and is provided with appropriate cable entry and exit openings (not shown) in its top and bottom walls. The various connections from the bus bars 36 and 22 to the branch circuits and to ground are made by means of screws 50.

The switch 30 is of a conventional double pole knife type with blades 52 mounted by pivots 54 connecting them to the fuses 34 for movement into and out of engagement with contacts on the terminals 28. Conjoint movement of the switch blades is assured by an insulating cross bar 56 connected by a spring loaded link 58 to an operating crank 60. Thus far the construction of the switch is conventional: however, the crank 60 is biased by a spring 62 connected between it and the casing 20 so as to urge the switch to an open condition with the blade 52 out of contact with the terminals 28. The switch can only be held in a closed position by means of a latch pin 64 on a latching arm 66, the latch pin 64 engaging a notch 68 in a latching disc 70. The latching arm 66 is secured to the casing 20 by a pivot 72. When the arm 66 is lifted so that the pin 64 disengages from the notch 68, the spring 62 operates so as rapidly to disengage the switch blades 52 from the terminals 28.

In order that the advantage of this rapid switch opening may be obtained when the switch is operated manually by means of the handle 46, the crank 60 is not directly connected to the handle. Instead, the handle 46 is connected to a disc 74 parallel to and coaxial with the disc 70, the end of the crank 60 being received in a bushing 76 formed in the shaft of the handle. The disc 70 and 74 are coupled by a pin 78 mounted towards the periphery of the disc 74 entering an arcuate slot 80 in the disc 70. This coupling provides a degree of lost motion determined by the length of the slot 80. The disc 74 is provided with a peripheral notch 82 which is also engageable by the latching pin 64. The notch 82 is provided with one sloping wall so as to provide a camming surface which lifts the pin 64 out of the notches 68 and 82 as the handle 46 is moved from the position shown in FIG. 3 towards that shown in FIG. 4. The pin and slot connection between the discs enables the disc 74 to move independently of the disc 70 so as to achieve the necessary camming action to lift the pin 64 whilst the latter locks the disc 70 against rotation. Furthermore, when the pin 64 is lifted clear of the notch 68, the crank 60 can then rotate so as to open the switch at a rate governed by the action of the spring 62 as the pin 78 moves back to its original position in the slot 80. This enables a much more rapid and decisive switch action to be achieved than would be possible were the handle 46 coupled directly to the crank 60.

The arm 66 is also coupled by a link 84 to the plunger 86 of the solenoid 38. When a sufficient current is passed through the coil of the solenoid 38, the plunger 86 is raised, and through the link 84 lifts the arm 66 and thus the latch pin 64 clear of the discs 70 and 74, whereupon the spring 62 immediately opens the switch 30, thus cutting off the installation supplied by the entry box from the supply and avoiding any risk of fire by reason of the ground fault which caused the current flow through the coil of the solenoid 38. The warning lamp and buzzer comprised by the alarm 40 are adjusted so as to provide a warning indication when a somewhat lower potential is developed across them than is required to develop sufficient current through the coil of the solenoid 38 to operate the latter. Thus in the event of a gradually developing ground leakage, advance warning is given before the supply is cut off. If the visual alarm in an incandescent lamp, then this will glow with a brightness dependent upon the magnitude of the leakage. In the event that the leakage occurs in the entry conduit, then the opening of the switch 30 will not interrupt the current through the alarm 40 which will continue to operate. The continued operation of the alarm combined with the open position of the switch 30 provides an immediate and continuing warning of a ground fault in the entry conduit so that appropriate action can be taken to interrupt the supply to the complete installation to enable repairs to be effected. A clearly visible warning should be provided on the service entry box that no attempt should be made to reset the switch 30 or interfere with the installation whilst the alarm is operating, since the operation of the alarm indicates that the ground return system must be at a potential substantially above ground potential.

Although in the event of a ground fault in the entry conduit the faulty portion of the installation is not isolated from the supply by the opening of the switch 30, a substantial degree of protection is still maintained since the leakage current is in any event limited to that through the alarm device and the solenoid winding. This current should not be sufficiently large to cause any local heating sufficient to give rise to a fire risk.

Figure 2:
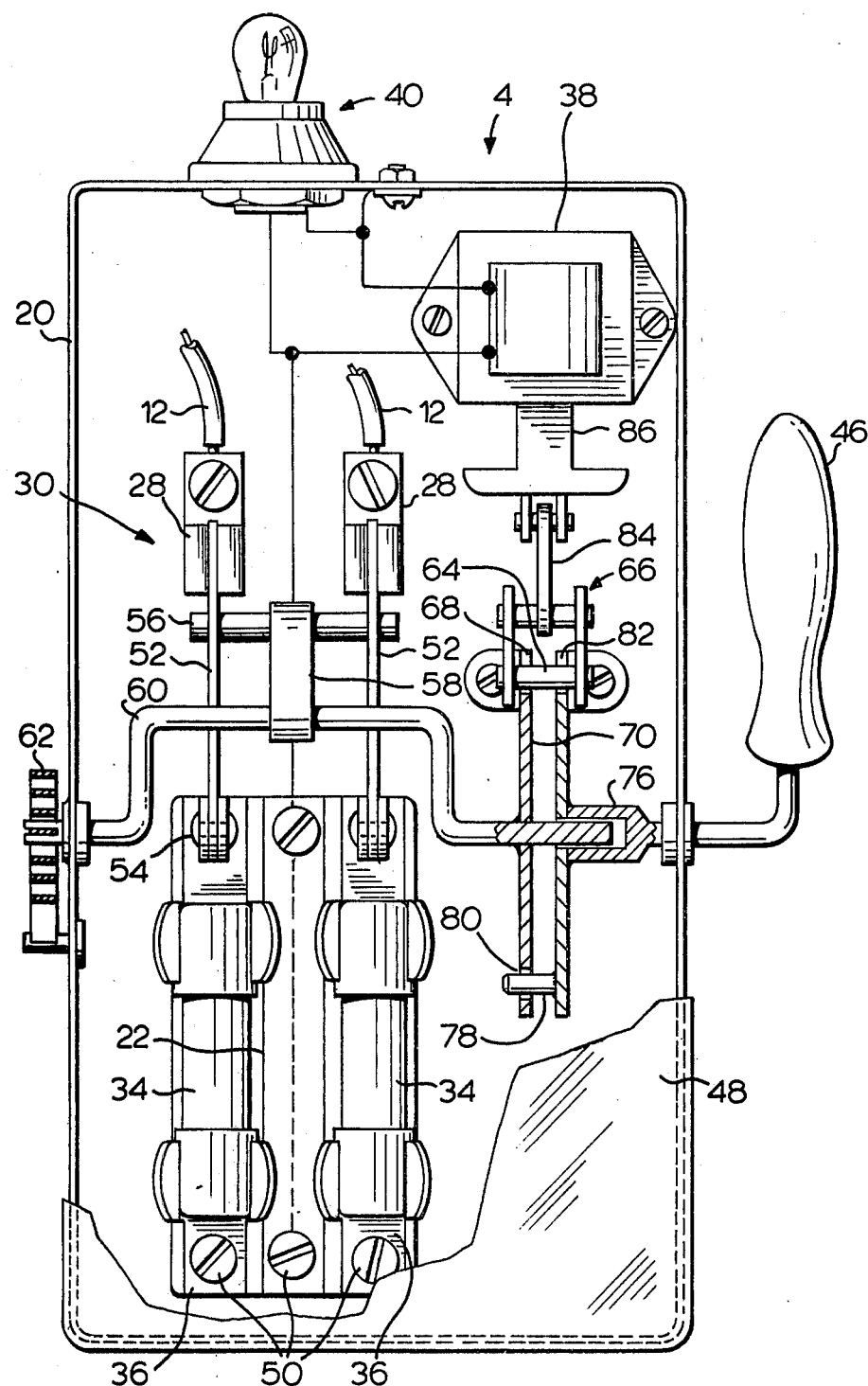
FIG. 2 is a front elevation of the service entry box, with its front cover largely cut away so as to show the interior mechanism.
Figure 3:
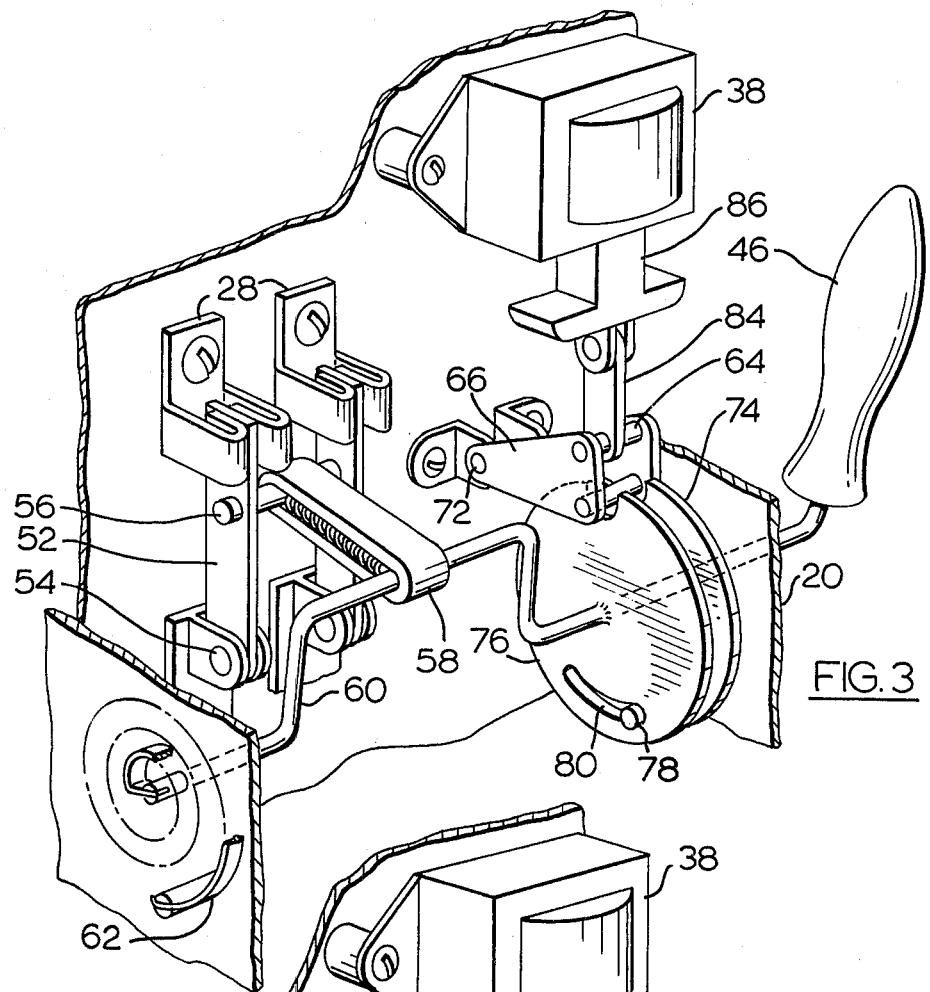
FIGS. 3 and 4 are perspective views showing part of the internal mechanism of the box, with a switch contained therein respectively in a closed and in an open condition.
Figure 4:
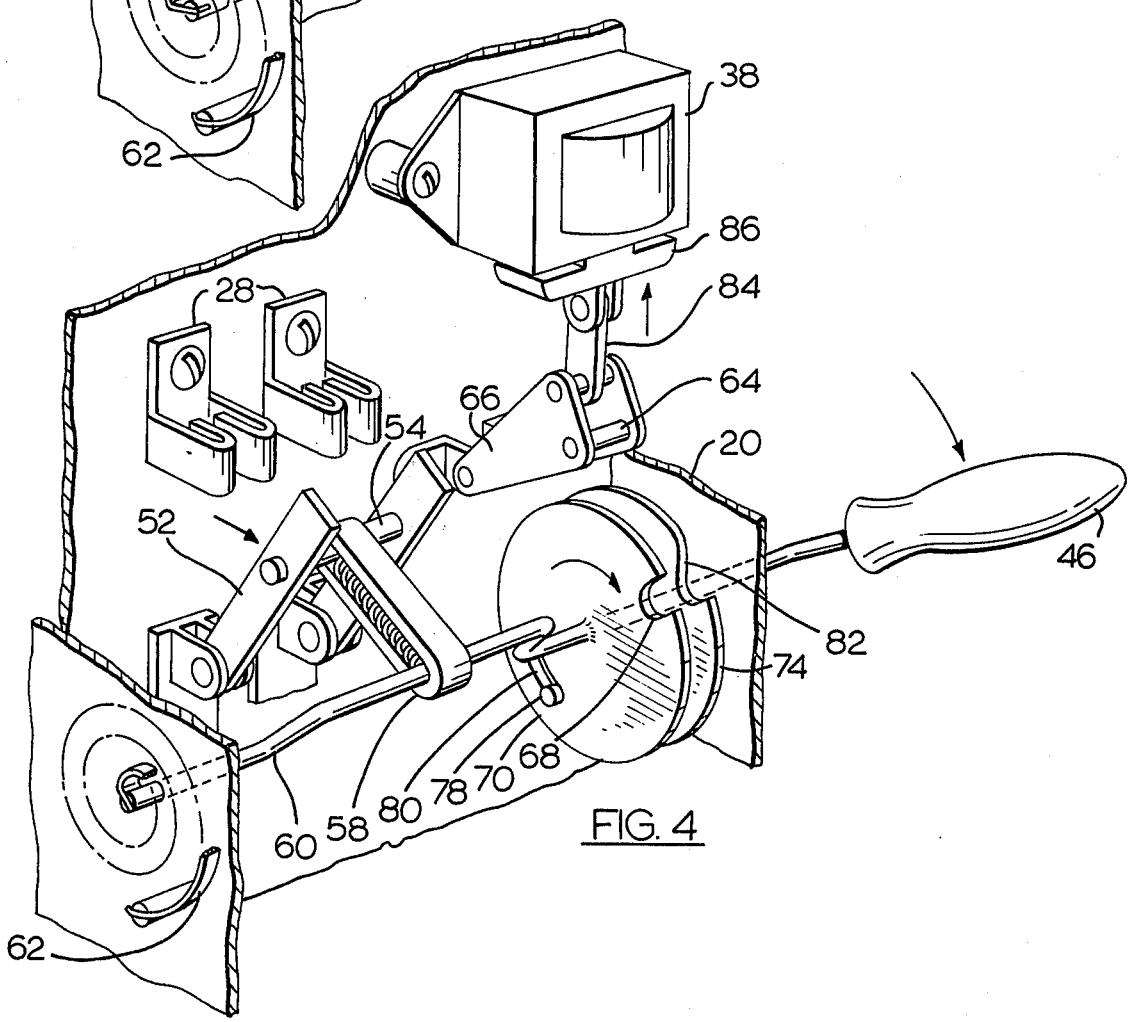
Figure 5:
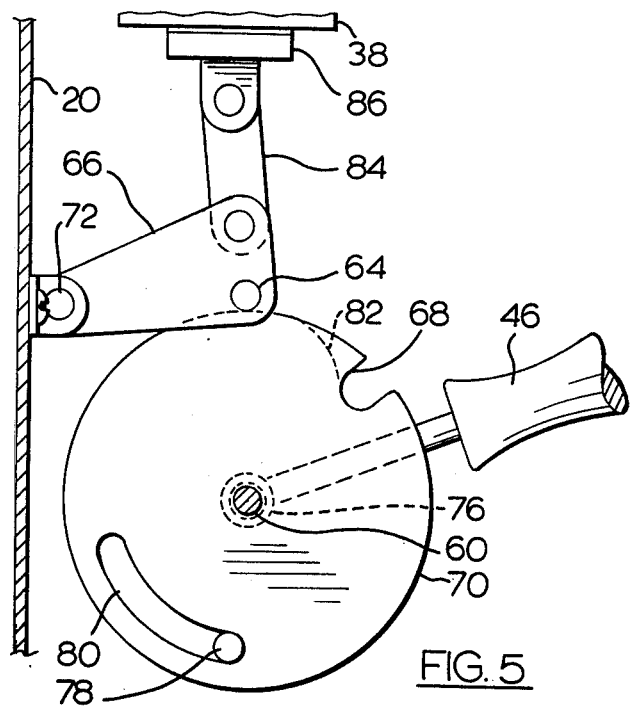
FIG. 5 is a further detail of the interior mechanism of the box.

In order to reset the apparatus and close the switch 30, the handle 46 is turned to the position shown in FIGS. 2 and 3. If a ground fault exists or has developed sufficient to energize the solenoid 38, the plunger 86 will be held in its raised position as soon as the switch closes, and the latch pin 64 will be unable to drop into the notches 68 and 82. Hence the switch will immediately reopen as soon as the handle is released. If there is no such fault, the latch pin will drop into the notches and hold the switch 30 closed.

It should be understood that although the solenoid and switch arrangement described is the most effective and simple way known to the inventor of putting the invention into effect, the essential aspect of the invention resides in the ground return system, including the casing of the service entry box, being isolated from ground and from the neutral conductors of the system, except for a connection established through means responsive to a predetermined current flowing between the ground return system and ground to operate means interrupting the supply to the system being protected.

Whilst the invention has been described as applied to a three wire electrical system in which two oppositely phased line conductors are utilized, it should be understood that it is equally applicable to single phase systems, and to three phase systems in which the branch circuits may themselves be three phase, or delta or wye connected. Moreover, although the invention is described as applied to a system in which the neutral conductor is grounded at the installation, it is equally applicable to systems in which there is no such local grounding.

What I claim is:

1. In an electrical installation having a supply main comprising a neutral conductor and at least one line conductor, a plurality of branch circuits, a service entry box establishing connection between the supply main conductors and the branch circuits and including manually operable switch means to interrupt the at least one line conductor, and a ground return system establishing a ground return path to the entry box in parallel with each of the branch circuits, the improvement wherein the ground return system and the service entry box are isolated from all neutral conductors in the installation, the switch means is biased to an open condition and includes latch means releasably to latch it in a closed condition, and the service entry box contains a solenoid electrically connected between the box and the neutral conductor and responsive to the passage of a predetermined current to release said latch means in the box.

2. An installation according to claim 1, wherein a warning device responsive to the passage of a current less than said predetermined current is connected between the box and the neutral conductor.

3. An installation according to claim 2, wherein the warning device comprises an incandescent lamp and a buzzer operable upon the current through the device reaching a predetermined level lower than that required to open the switch means.

4. An installation according to claim 1, wherein the distribution box is the service entry box of a domestic electrical installation, the supply main is a three wire main with two line conductors having equal and opposite potentials relative to the neutral conductor, wherein the neutral conductor is grounded, and wherein the ground return system and the surface entry box are isolated from ground.

5. A service entry box comprising a conductive casing, means to connect the line and neutral conductors of a supply cable to line and neutral bus bars mounted within and electrically isolated from the casing, means to establish a ground connection to the neutral bus bar, manually operable switch means mounted within the box, means to latch the switch means in a closed condition to establish electrical connection between at least one line conductor of the supply cable and the corresponding line bus bar, and solenoid operated means for unlatching said latching means connected between the casing and the neutral bus bar.

6. A service entry box according to claim 4 wherein an electrically operated alarm device is connected between the casing and the neutral bus bar.

7. A service entry box according to claim 6 wherein the warning device comprises a buzzer.

8. A service entry box according to claim 6 wherein the warning device comprises an incandescent lamp.

9. A service entry box according to claim 4 including a resistance and a normally open switch connected in series between the casing and a line bus bar enabling simulation of a ground leakage for test purposes.

10. A service entry box according to claim 4 wherein the switch means is a knife switch spring biased to an open position and including an operating shaft operable to move the switch between open and closed positions, the box being provided with an external switch operating handle, a lost motion linkage connecting the handle to the operating shaft, means to latch said shaft in a position corresponding to a closed condition of the switch, and means connected to said operating handle and operative on movement of the handle to release said latching means, wherein the solenoid operated unlatching means is a solenoid having a plunger connected to said latching means and movable on energization of the solenoid to a position corresponding to an unlatched position of said latching means.

11. A service entry box according to claim 10, wherein the operating shaft is connected to a first disc and the handle is connected to a second disc parallel and coaxial to the first disc, each disc being provided with a peripheral notch and the latching means includes a latching pin engagable with said notches, the notch in the second disc being shaped so as to provide a camming surface operative to lift said latching pin clear of the notch in the first disc as the handle is operated to move the notch in the second disc out of register with said latching pin.

12. A service entry box comprising a casing enclosing at least one line bus bar, a switch operative to establish connection between at least one line conductor in a supply circuit and the at least one line bus bar for establishing connections to branch circuits, a neutral bus bar for establishing connections between a neutral conductor of the supply circuit and said branch circuits, a solenoid connected between said neutral bus bar and said casing, a spring biasing such switch into an open condition, and a latch operative to hold said switch in a closed condition, the solenoid being connected to the latch to hold the latter in an inoperative condition when the solenoid is energized, and the bus bars all being isolated from the casing.

13. A service entry box according to claim 12, wherein the switch has an operating shaft, a latching disc is mounted on the operating shaft, and the latch means is engageable with a notch in the periphery of the disc, and the solenoid has a plunger linked to the latch for movement therewith between a position corresponding to an unenergized condition of the solenoid in which the latch engages the disc, and an energized condition of the solenoid in which the latch is withdrawn from engagement with the disc.

14. A service entry box as claimed in claim 13 wherein an operating handle external of the box is connected to a disc within the box and parallel to and concentric with the disc carried by the switch shaft, a lost motion linkage is provided connecting the two discs, and the disc attached to the handle is formed with a camming surface operative on movement of said handle to take up said lost motion to lift said latch out of engagement with said first disc.

15. An installation according to claim 1, including a metal entry conduit connected to the entry box, the supply main passing through the conduit.

* * * * *